(12) United States Patent
Ghose et al.

(10) Patent No.: US 11,429,467 B2
(45) Date of Patent: Aug. 30, 2022

(54) METHOD AND SYSTEM FOR PREDICTION OF CORRECT DISCRETE SENSOR DATA BASED ON TEMPORAL UNCERTAINTY

(71) Applicant: Tata Consultancy Services Limited, Mumbai (IN)

(72) Inventors: Avik Ghose, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 395 days.

(21) Appl. No.: 16/728,528

(22) Filed: Dec. 27, 2019

(65) Prior Publication Data

US 2020/0210265 A1    Jul. 2, 2020

(30) Foreign Application Priority Data

Dec. 31, 2018   (IN) .............................. 201821049989

(51) Int. Cl.
*G06F 11/07* (2006.01)
*G06N 3/02* (2006.01)
*G05B 23/02* (2006.01)

(52) U.S. Cl.
CPC ...... *G06F 11/0745* (2013.01); *G05B 23/0221* (2013.01); *G06F 11/0793* (2013.01); *G06N 3/02* (2013.01)

(58) Field of Classification Search
CPC ............. G06F 11/0745; G06F 11/0793; G05B 23/0221; G06N 3/02
See application file for complete search history.

(56) References Cited

U.S. PATENT DOCUMENTS 9,547,768 B2 *   1/2017  Ukil ..................... G06F 21/577

OTHER PUBLICATIONS

Lipton, Z.C. et al. (2016). "Modeling Missing Data in Clinical Time Series with RNNs," *Proceedings of Machine Learning for Healthcare*, vol. 56; 17 pages.
Shao, Y. et al. "Reconstruction of Missing Big Sensor Data," *2016 2nd IEEE International Conference on Computer and Communications (ICCC)*, Oct. 14-17, 2016, Chengdu, China; pp. 1-13.
Li, Y.Y. et al. "A spatial-temporal imputation technique for classification with missing data in a wireless sensor network," *Proceedings of IEEE International Conference on Intelligent Robots and Systems*, Sep. 22-26, 2008, Nice, France; 8 pages.

* cited by examiner

*Primary Examiner* — Manuel A Rivera Vargas
(74) *Attorney, Agent, or Firm* — Finnegan, Henderson, Farabow, Garrett & Dunner, LLP (57) ABSTRACT

This disclosure relates generally to a method and system for prediction of correct discrete sensor data, thus enabling continuous flow of data even when a discrete sensor fails. The activities of humans/subjects, housed in a smart environment is continuously monitored by plurality of non-intrusive discrete sensors embedded in living infrastructure. The collected discrete sensor data is usually sparse and largely unbalanced, wherein most of the discrete sensor data is 'No' and comparatively only a few samples of 'Yes', hence making prediction very challenging. The proposed prediction techniques based on introduction of temporal uncertainty is performed in several stages which includes pre-processing of received discrete sensor data, introduction of temporal uncertainty techniques followed by prediction based on neural network techniques of learning pattern using historical data.

9 Claims, 8 Drawing Sheets

METHOD AND SYSTEM FOR PREDICTION OF CORRECT DISCRETE SENSOR DATA BASED ON TEMPORAL UNCERTAINTY

CROSS-REFERENCE TO RELATED APPLICATIONS AND PRIORITY

The present application claims priority from Indian provisional specification no. 201821049989 filed on 31 Dec. 2018.

TECHNICAL FIELD

The disclosure herein generally relates to field of prediction of correct discrete sensor data and, more particularly, to a method and a system for prediction of correct discrete sensor data based on temporal uncertainty.

BACKGROUND

In today's technology enriched society, sensors are an important source of real time data for various applications across different domains, such as smart environment, assistance systems, robotics, environmental motoring and human activity recognition and so on. The main purpose of sensors is to collect data from the surrounding environment, which is further processed and analyzed for various applications.

Sensor networks and their systems can fail due to multiple reasons including intrusion attacks, node failures, and link failures and so on. The sensor failure leads to missing or corrupt data collection by sensors systems wherein corrupt or missing data can cause prediction inaccuracies or problems in continuous events processing process, which results in complete failure of a system. Hence for enabling a continuous flow of data even when the sensor fails temporarily, forecasting or estimation techniques are used.

Forecasting or estimation techniques such as time-series prediction has been used for both forecasting as well as filling in missing data. However the forecasting techniques for binary or discrete sensor data collected using advanced sensors is high dimensional, hence it cannot be easily forecasted using existing techniques. The discrete sensor data is sparse and largely unbalanced, wherein most of the time the sensor data is 'No' and comparatively only a few samples of 'Yes' is available. In such unbalanced discrete sensor data cases, where most of the time the sensor data is 'No' and comparatively only a few samples of 'Yes', the predicted/forecasted sensor data would be 'No'. Further in such largely unbalanced discrete sensor data cases, mere usage of neural network based techniques such as Recurrent Neural Networks (RNN) or Long Short-Term Memory (LSTM) technique based deep model may not predict or forecast accurately.

SUMMARY

Embodiments of the present disclosure present technological improvements as solutions to one or more of the above-mentioned technical problems recognized by the inventors in conventional systems. For example, in one embodiment, a method and system for prediction of correct discrete sensor data is provided, enabling continuous flow of data even when a discrete sensor fails. The collected discrete sensor data is usually sparse and largely unbalanced, wherein most of the discrete sensor data is 'No' or '0' and comparatively only a few samples of Yes' or '1', hence making prediction very challenging. The proposed prediction techniques based on introduction of temporal uncertainty is performed in several stages which includes pre-processing of received discrete sensor data, introduction of temporal uncertainty techniques followed by prediction based on neural network techniques of learning pattern using historical data.

In another aspect, a method for prediction of correct discrete sensor data based on temporal uncertainty is provided. The method includes receiving discrete sensor data relating to a human using a plurality of sensors, wherein the discrete sensor data that is received using plurality of discrete sensors indicates activities relating to the human for a specific time interval. Further the method includes identifying a corrupt discrete sensor data in the received discrete sensor data, wherein the corrupt discrete sensor data is identified by a sensor status parameter. Furthermore the method includes converting the identified corrupt discrete sensor data in to a pseudo-continuous sensor data, wherein the identified corrupt discrete sensor data is converted in to the pseudo-continuous sensor data by assigning a random value from a pre-defined range individually for positive and negative discrete sensor data. Further the method includes introducing the temporal uncertainty in to the pseudo-continuous sensor data, wherein temporal uncertainty is introduced in to the pseudo-continuous sensor data by replacing the pseudo-continuous sensor data by a random value from a pre-defined range. Furthermore the method includes substituting the temporal uncertainty introduced pseudo-continuous sensor data with a correct sensor data using a Long Short-Term Memory (LSTM) technique to predict a corrected continuous sensor data, wherein corrected continuous sensor data is predicted based on a learning pattern and historical data stored in a database. Finally the method includes reconverting the corrected continuous sensor data to corrected discrete sensor data, wherein the corrected continuous sensor data is re-converted back to its original discrete format by replacing corrected continuous sensor data by pre-defined binary values.

In another aspect, a system for prediction of correct discrete sensor data based on temporal uncertainty is provided. The system comprises a memory storing instructions and a centralized database, one or more communication interfaces; and one or more hardware processors coupled to the memory via the one or more communication interfaces, wherein the one or more hardware processors are configured by instructions to a pre-processor for receiving the discrete sensor data relating to a human using a plurality of sensors and identifying a corrupt discrete sensor data in the received discrete sensor data. Further the system comprises a converter converting the identified corrupt discrete sensor data in to a pseudo-continuous sensor data. Furthermore the system comprises a processor introducing the temporal uncertainty in to the pseudo-continuous sensor data; a correct data predictor substituting the temporal uncertainty introduced pseudo-continuous sensor data with a correct sensor data using a Long Short-Term Memory (LSTM) technique to predict a corrected continuous sensor data. Finally the system comprises and a re-converter for reconverting the corrected continuous sensor data to corrected discrete sensor data.

In yet another aspect, a non-transitory computer readable medium for prediction of correct discrete sensor data based on temporal uncertainty is provided. The program includes receiving discrete sensor data relating to a human using a plurality of sensors, wherein the discrete sensor data that is received using plurality of discrete sensors indicates activities relating to the human for a specific time interval. Further the program includes identifying a corrupt discrete sensor data in the received discrete sensor data, wherein the corrupt discrete sensor data is identified by a sensor status parameter. Furthermore the program includes converting the identified corrupt discrete sensor data in to a pseudo-continuous sensor data, wherein the identified corrupt discrete sensor data is converted in to the pseudo-continuous sensor data by assigning a random value from a pre-defined range individually for positive and negative discrete sensor data. Further the program includes introducing the temporal uncertainty in to the pseudo-continuous sensor data, wherein temporal uncertainty is introduced in to the pseudo-continuous sensor data by replacing the pseudo-continuous sensor data by a random value from a pre-defined range. Furthermore the program includes substituting the temporal uncertainty introduced pseudo-continuous sensor data with a correct sensor data using a Long Short-Term Memory (LSTM) technique to predict a corrected continuous sensor data, wherein corrected continuous sensor data is predicted based on a learning pattern and historical data stored in a database. Finally the program includes reconverting the corrected continuous sensor data to corrected discrete sensor data, wherein the corrected continuous sensor data is re-converted back to its original discrete format by replacing corrected continuous sensor data by pre-defined binary values.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

Figure 1:
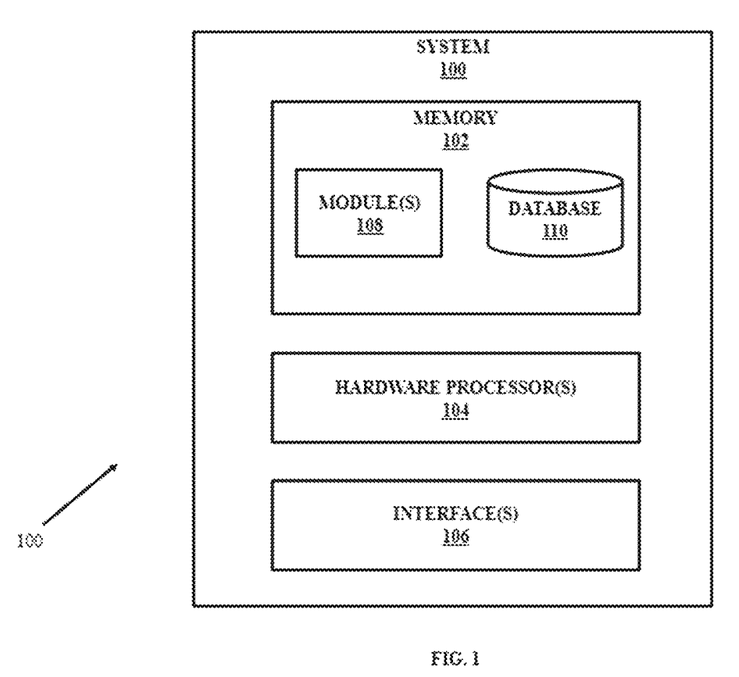
FIG. 1 illustrates an exemplary block diagram of a system for prediction of correct discrete sensor data based on temporal uncertainty in accordance with some embodiments of the present disclosure.

FIG. 1 illustrates an exemplary block diagram of a system 100 for authenticating humans based on behavioral pattern according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises one or more modules 108 and the database 110. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical subject interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
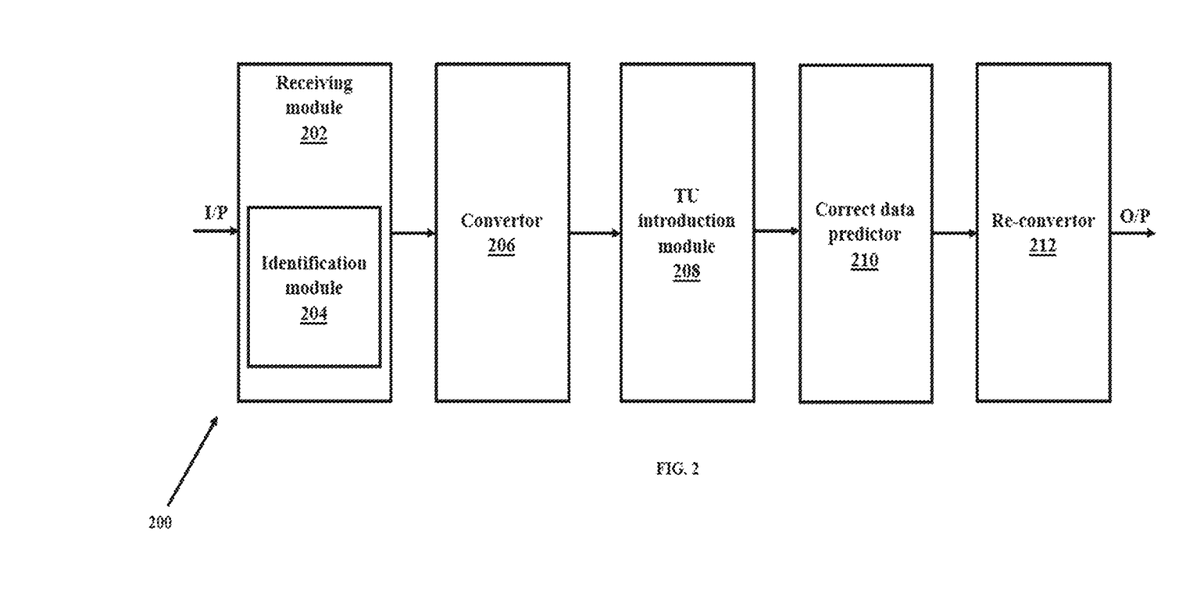
FIG. 2 is a functional block diagram of various modules stored in module(s) of a memory of the system of FIG. 1 in accordance with some embodiments of the present disclosure.

FIG. 2, with reference to FIG. 1, is a block diagram of various modules 108 stored in the memory 102 of the system 100 of FIG. 1 in accordance with an embodiment of the present disclosure. In an embodiment of the present disclosure, the modules 108 include a receiving module 202 which further includes an identification module 204, a convertor 206, a TU introduction module 208, a correct data predictor 210 and a re-convertor 212 that are implemented as at least one of a logically self-contained part of a software program, a self-contained hardware component, and/or, a self-contained hardware component with a logically self-contained part of a software program embedded into each of the hardware component that when executed perform the above method described herein.

According to an embodiment of the disclosure, the system 200 comprises the receiving module 202 that is configured for receiving discrete sensor data using a plurality of sensors from a human. The receiving module 202 further comprises of the identification module 204 that is configured for identifying a corrupt discrete sensor data in the received discrete sensor data. The received discrete sensor data indicates Activities of Daily Living (ADL) pertaining to a subject for a specific time interval from a smart environment. In an embodiment, a plurality discrete sensors are embedded in a smart environment such as an old age home, orphanage or home and so on. The plurality of sensors used are discrete/binary (such as pressure switches, temperature switches, thru-beam photoelectric sensors, proximity sensors, push buttons and so on) sensors which are unobtrusive and non-intrusive. The plurality of discrete sensors continuously monitor routine activities of subjects housed in the smart environment. The plurality of discrete sensors are connected to a variety of network devices, including routers, bridges, servers, computing devices, storage devices.

In an embodiment, discrete sensor data comprises parameters such as sensor replication, sensor status, sensor position, remaining battery life (used to power up the sensor), current date and time as illustrated below in table 1:

TABLE 1

| | | Discrete Sensor Data | | | |
|---|---|---|---|---|---|
| Date | Time | Sensor status | Sensor replication | Location of sensor | Sensor type |
| 2018:12:01 | 00:00:37 | OK | 1 | door | PIR |
| 2018:12:01 | 00:00:37 | NOK | 0 | bed | Vibration |
| 2018:12:01 | 00:00:37 | OK | 23 | Bed room | temperature |
| 2018:12:01 | 00:00:37 | OK | 0 | kitchen | PIR |

As can be depicted from the above Table 1, discrete sensor data indicates ADL pertaining to a human for a specific time interval from a smart environment. However, the ADL activities may not be received at all times due to failure or faulty sensors that may be caused due to various reasons that include battery drain, communication outage, malfunctioning. Due to sensor failures, the received discrete sensor data contains both correct and corrupt discrete sensor data, wherein the corrupt discrete sensor data refers to gaps in the received discrete sensor data that caused due to sensor failure. Further one of the parameters of the discrete sensor enables to identify corrupt discrete sensor data. In an embodiment, a 'sensor status' parameter enables identification of corrupt discrete sensor data wherein, the sensor status parameter reflects 'NOK' during a sensor failure and the sensor status is reflects "OK", when the sensor is receiving sensor data. Considering an use case example for discrete sensor data collected, if collected sensor data is labeled on basis of sensor replication, sensor status and sensor position" as on 1-1-2017 at 1:00:07 sensor position is bed, sensor replication is 1 and sensor status is OK, then sensor labelling would be 1-1-2018 at 1:00:07 subject is on the bed and activity is labeled as resting/sleeping.

According to an embodiment of the disclosure, the system 200 further comprises the convertor 206 that is configured for converting the identified corrupt discrete sensor data in to a pseudo-continuous sensor data. The identified corrupt discrete sensor data is converted in to the pseudo-continuous sensor data by assigning a random value, from a pre-defined range individually for positive and negative discrete sensor data. Further the random value is assigned based on well-known random sampling techniques. In an embodiment, positive discrete sensor data may be represented by 'Yes' or '0' and negative discrete sensor data may be represented by 'Yes' or '0'. Further based on proposed random sampling techniques the identified corrupt discrete sensor data is converted to pseudo-continuous and finally represented in form of an array which represents pseudo-continuous sensor data. Considering an use case example, if sample negative discrete sensor data value is '0', a random value between a pre-defined range (−1, −0.5, 0.01) is assigned to the negative discrete sensor data value, and represented as an array parameter "dataClassNoEvent" while for a positive discrete sensor data value is '1', a random value between a pre-defined range (0.5, 1.0,0.01) is assigned to the positive discrete sensor data value, and represented as an array parameter "dataClassEvent" as shown below;

dataClassNoEvent←range(−1:0; −0:5; 0:01)
dataClassEvent←range(0:5; 1:0; 0:01)

Figure 4:
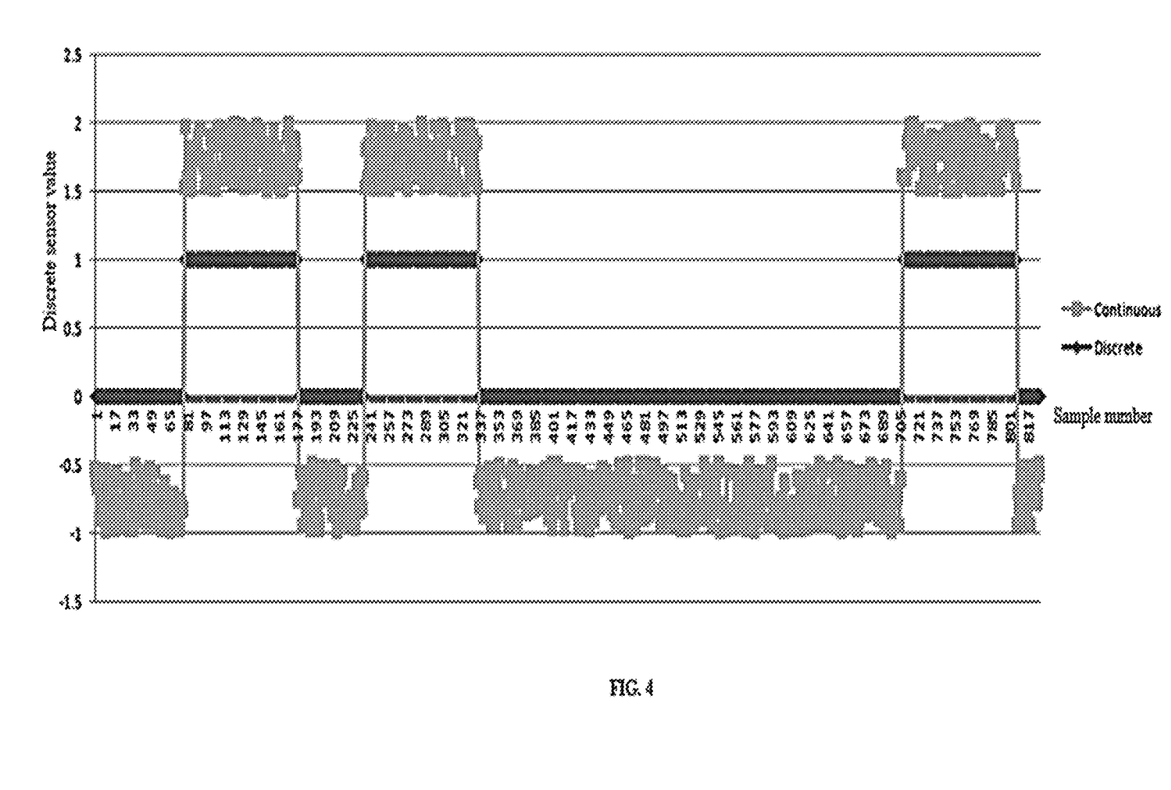
FIG. 4 illustrates graphs of pseudo-continuous sensor data, which was converted from corrupt discrete sensor data, according to some embodiments of the present disclosure.

In an embodiment, FIG. 4 illustrates graphs of pseudo-continuous sensor data, which was converted from corrupt discrete sensor data, where X-Axis represents sample number of the discrete sensor data and Y-Axis represents corresponding discrete sensor value.

According to an embodiment of the disclosure, the system 200 further comprises the TU introduction module 208 that is configured for introducing the temporal uncertainty in to the pseudo-continuous sensor data. The temporal uncertainty is introduced in to the pseudo-continuous sensor data by replacing the pseudo-continuous sensor data by a random value from a pre-defined range. In an embodiment, the temporal uncertainty is introduced in to the pseudo-continuous sensor data is represented by parameter 'dataArray', where index represents the index of the dataArray, as shown below;

```
for ∀ data ∈ dataArray do
    if data.type == 0 then
        data.type ← randomIndex(dataClassNoEvent)
    else
        for i ∈ range(data.index − 50, data.index + 50,1)
        do
            dataArray[i] ← typerandomIndex(dataClassEvent)
randomIndex(dataClassEvent)
```

Figure 5:
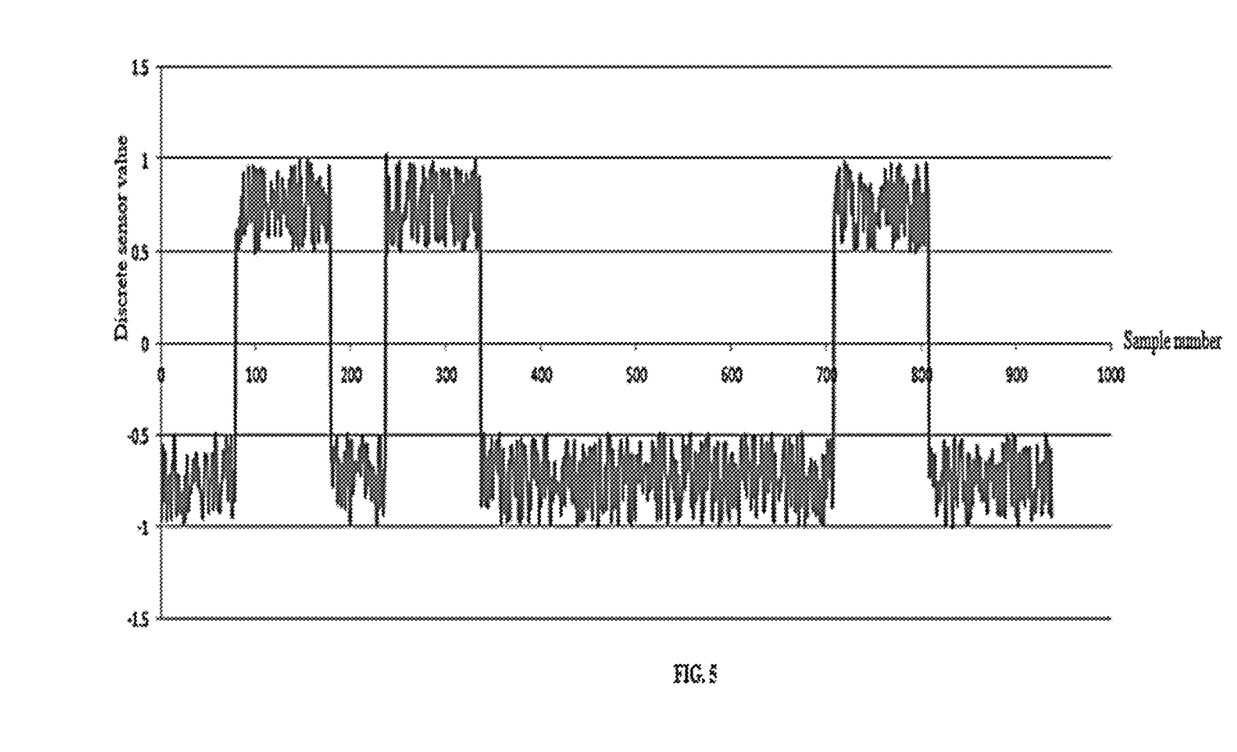
FIG. 5 illustrates graphs of pseudo-continuous sensor data, which has been introduced with temporal uncertainty, according to some embodiments of the present disclosure.

In an embodiment, FIG. 5 illustrates graphs of pseudo-continuous sensor data, which has been introduced with temporal uncertainty, where X-Axis represents sample number of the discrete sensor data and Y-Axis represents corresponding discrete sensor value.

Figure 6:
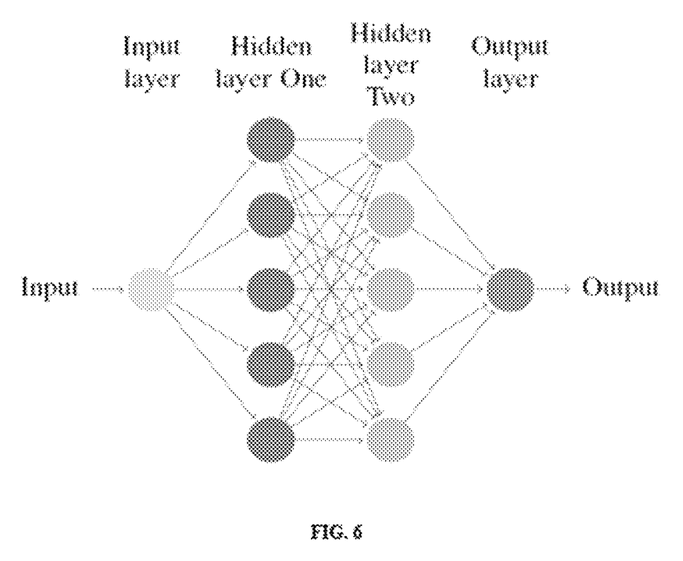
FIG. 6 illustrates proposed LSTM network for predicting a corrected continuous sensor data, according to some embodiments of the present disclosure.

According to an embodiment of the disclosure, the system 200 further comprises the correct data predictor 210 that is configured for substituting the temporal uncertainty introduced pseudo-continuous sensor data with a correct sensor data using a Long Short-Term Memory (LSTM) technique to predict a corrected continuous sensor data. The corrected continuous sensor data is predicted using LSTM based on a learning pattern and historical data stored in a database 110. In an embodiment, the proposed LSTM network is designed as illustrated in FIG. 6, wherein a data batch for one week at a time for each sensor. Hence for each sensor, a batch size of 40320 is used for every 15 seconds. The proposed LSTM network type is a stateful LSTM network, with one input layer, and two hidden layers of dimension 50 each, each 10 neurons are symbolized as one in network architecture for space constraint. Further number of epochs used is 200, and the loss function is based on RMSE (Root Mean Squared Error) as time-series is predicted or forecasting.

According to an embodiment of the disclosure, the system 200 further comprises the re-convertor 212 that is configured for reconverting the corrected continuous sensor data to corrected discrete sensor data. The corrected continuous sensor data is re-converted back to its original discrete format by replacing corrected continuous sensor data by pre-defined binary values. In an embodiment, re-conversion also referred to as "Quantization", wherein corrected continuous sensor data (represented using parameter 'resultArray' and index is the index of the resultArray) is re-converted back to its original format of corrected discrete sensor data by replacing corrected continuous sensor data by pre-defined binary values, such as positive corrected continuous sensor data is replaced by a pre-defined binary values of 1 and negative corrected continuous sensor data is replaced by a pre-defined binary values of 0 as shown below;

```
procedure QUANTIZE(resultArray)
    for ∀ data ∈ resultArray do
        if data.type ≤ 0 then
            data.type ← 0
        else
            for i ∈ range(data.index,data.index + 100,1)
            do
                i ≠ (data.index + 50) then data.type ← 0
```

Figure 7:
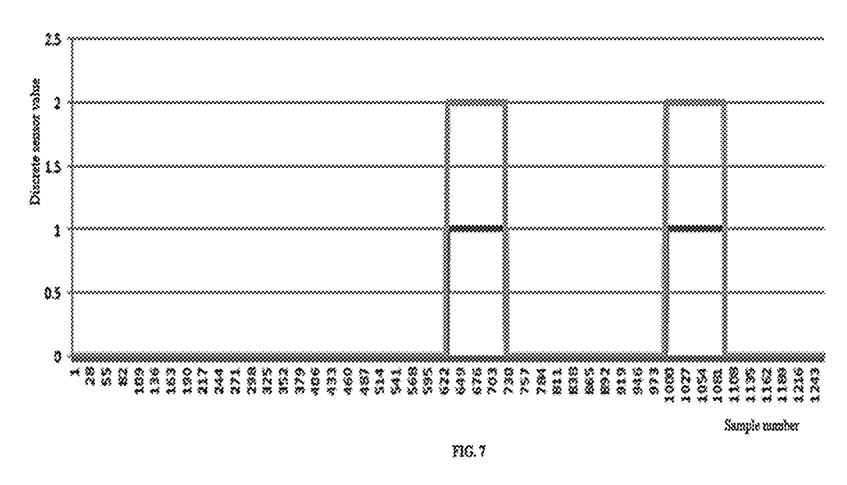
FIG. 7 illustrates graphs of corrected discrete sensor data, according to some embodiments of the present disclosure.
Figure 8:
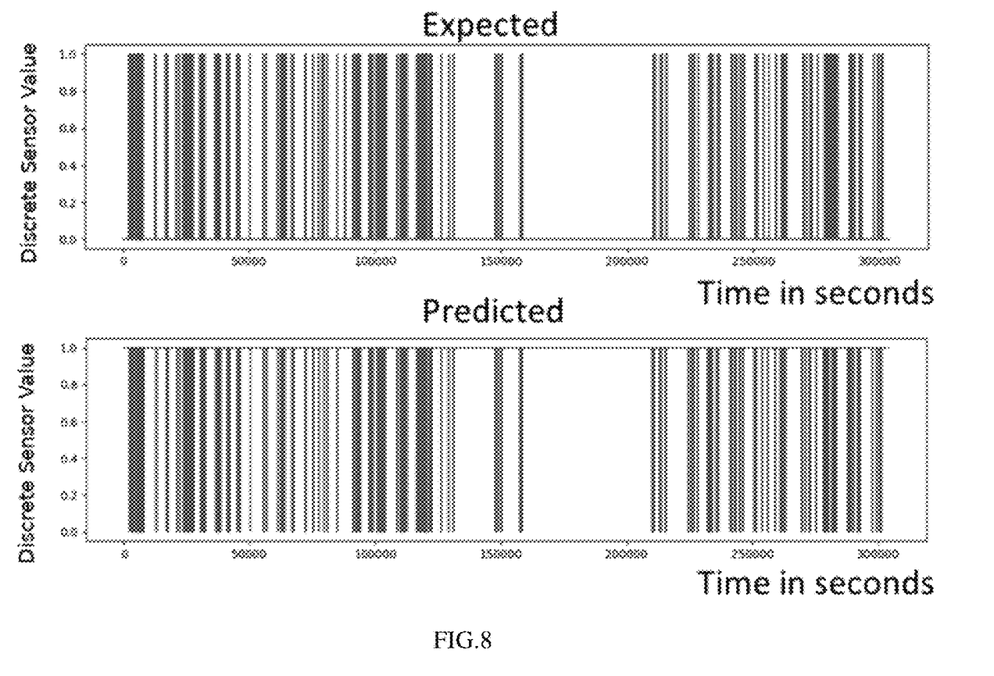
FIG. 8 illustrates predicted and expected graphs of corrected continuous sensor data sensor value using Long Short-Term Memory (LSTM) techniques, according to some embodiments of the present disclosure.

Thus the corrected continuous sensor data is reconverted back to its original format of discrete data and displayed as corrected discrete sensor data. In an embodiment, FIG. 7 illustrates graphs of corrected discrete sensor data, which has been introduced with temporal uncertainty, where X-Axis represents sample number of the discrete sensor data and Y-Axis represents corresponding discrete sensor value. Further, FIG. 8 illustrates predicted and expected graphs of corrected continuous sensor data sensor value using Long Short-Term Memory (LSTM) techniques, where X-Axis represents sample number of the discrete sensor data and Y-Axis represents corresponding time in seconds.

Figure 3:
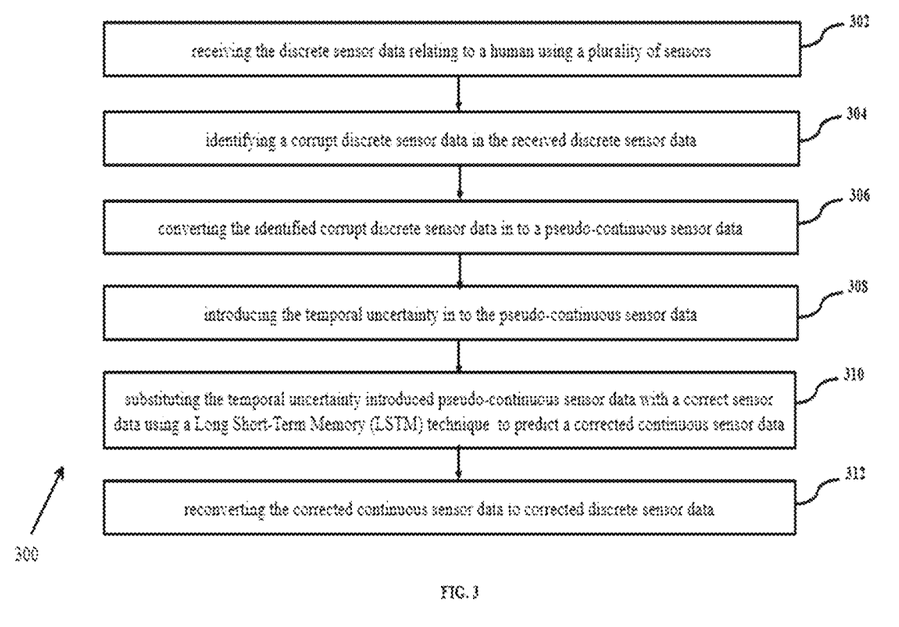
FIG. 3 is an exemplary flow diagram illustrating a method for prediction of correct discrete sensor data based on temporal uncertainty using the system of FIG. 1 in accordance with some embodiments of the present disclosure.

FIG. 3, with reference to FIGS. 1-2, is an exemplary flow diagram illustrating a method for prediction of correct discrete sensor data based on temporal uncertainty using the system 100 of FIG. 1 according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 and the modules 202-212 as depicted in FIGS. 1-2, and the flow diagram as depicted in FIG. 3.

At step 302, receiving the discrete sensor data relating to a human using a plurality of sensors is received by the receiving module 202. The discrete sensor data that is received using plurality of discrete sensors indicates activities of daily living (ADL) relating to the human for a specific time interval.

In the next step at step 304, in the identification module 204, a corrupt discrete sensor data is identified in the received discrete sensor data based on a 'sensor status' parameter obtained from the received sensor data.

In the next step at 306, in the convertor 206, the identified corrupt discrete sensor data is converted to a pseudo-continuous sensor data, wherein the identified corrupt discrete sensor data is converted in to the pseudo-continuous sensor data by assigning a random value from a pre-defined range individually for positive and negative discrete sensor data.

In the next step at 308, in the TU introduction module 208, temporal uncertainty is introduced in to the pseudo-continuous sensor data, by replacing the pseudo-continuous sensor data by a random value from a pre-defined range.

In the next step at 310, in the correct data predictor 210, the temporal uncertainty introduced pseudo-continuous sensor data is substituting with a correct sensor data using a Long Short-Term Memory (LSTM) technique to predict a corrected continuous sensor data based on a learning pattern and historical data stored in a database.

In the next step at 312, in the re-convertor 212, the corrected continuous sensor data is reconverted to corrected discrete sensor data, wherein the corrected continuous sensor data is re-converted back to its original discrete format by replacing corrected continuous sensor data by pre-defined binary values.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Hence the proposed method and system for prediction of correct discrete sensor data enables continuous flow of data even when a discrete sensor fails. The collected discrete sensor data is usually sparse and largely unbalanced, wherein most of the discrete sensor data is 'No' or '0' and comparatively only a few samples of 'Yes' or '1', hence making prediction very challenging. The proposed prediction techniques based on introduction of temporal uncertainty is performed in several stages which includes pre-processing of received discrete sensor data, introduction of temporal uncertainty techniques followed by prediction based on neural network techniques of learning pattern using historical data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for prediction of correct discrete sensor data, the method comprising:
   receiving the discrete sensor data relating to a human using a plurality of sensors (302);
   identifying a corrupt discrete sensor data in the received discrete sensor data (304);
   converting the identified corrupt discrete sensor data in to a pseudo-continuous sensor data (306);
   introducing a temporal uncertainty into the pseudo-continuous sensor data (308);
   substituting the temporal uncertainty introduced pseudo-continuous sensor data with a correct sensor data using a Long Short-Term Memory (LSTM) technique to predict a corrected continuous sensor data (310); and
   reconverting the corrected continuous sensor data to corrected discrete sensor data (312).

2. The method of claim 1, wherein the discrete sensor data that is received using plurality of discrete sensors indicates activities relating to a human for a specific time interval.

3. The method of claim 1, wherein the corrupt discrete sensor data is identified by a sensor status parameter.

4. The method of claim 1, wherein the identified corrupt discrete sensor data is converted in to the pseudo-continuous sensor data by assigning a random value from a pre-defined range individually for positive and negative discrete sensor data.

5. The method of claim 1, wherein temporal uncertainty is introduced in to the pseudo-continuous sensor data by replacing the pseudo-continuous sensor data by a random value from a pre-defined range.

6. The method of claim 1, wherein corrected continuous sensor data is predicted based on a learning pattern and historical data stored in a database.

7. The method of claim 1, wherein the corrected continuous sensor data is re-converted back to its original discrete format by replacing corrected continuous sensor data by pre-defined binary values.

8. A system for prediction of correct discrete sensor data, comprising:
   a memory (102) storing instructions and one or more modules (108);
   a database (110);
   one or more communication or input/output interfaces (106); and
   one or more hardware processors (104) coupled to the memory (102) via the one or more communication interfaces (106), wherein the one or more hardware processors (104) are configured by the instructions to execute the one or more modules (108) comprising:
   a receiving module (202) for receiving the discrete sensor data relating to a human using a plurality of sensors
   an identification module (204) identifying a corrupt discrete sensor data in the received discrete sensor data;
   a converter (206) converting the identified corrupt discrete sensor data into a pseudo-continuous sensor data;
   a TU introduction module (208) introducing a temporal uncertainty into the pseudo-continuous sensor data;
   a correct data predictor (210) substituting the temporal uncertainty introduced pseudo-continuous sensor data with a correct sensor data using a Long Short-Term Memory (LSTM) technique to predict a corrected continuous sensor data; and
   a re-converter (212) for reconverting the corrected continuous sensor data to corrected discrete sensor data.

9. A non-transitory computer-readable medium having embodied thereon a computer readable program, wherein the computer readable program, when executed by one or more hardware processors, cause:
   receiving the discrete sensor data relating to a human using a plurality of sensors;
   identifying a corrupt discrete sensor data in the received discrete sensor data;
   converting the identified corrupt discrete sensor data into a pseudo-continuous sensor data;
   introducing a temporal uncertainty into the pseudo-continuous sensor data;
   substituting the temporal uncertainty introduced pseudo-continuous sensor data with a correct sensor data using a Long Short-Term Memory (LSTM) technique to predict a corrected continuous sensor data; and reconverting the corrected continuous sensor data to corrected discrete sensor data.

* * * * *